Dec. 9, 1969  J. L. LEESON, JR  3,483,364
ELECTRICAL 3D CAM
Filed Sept. 12, 1967  8 Sheets-Sheet 2

Fig. 3a.

| VOLTAGE RANGES OF MATRIX CONTROL SWITCHES | |
|---|---|
| $A'_0 \& B'_0$ | 0 - 1v |
| $A'_1 \& B'_1$ | 1 - 2v |
| $A'_2 \& B'_2$ | 2 - 3v |
| $A'_3 \& B'_3$ | 3 - 4v |

INVENTOR.
JAMES L. LEESON, JR.
BY
Wolfe, Hubbard, Voit & Osann
ATTORNEYS.

50% TIME SHARING WHERE
$$\frac{A_{n+1} - A}{A - A_n} = 1$$

Fig. 4d.

25% - 75% TIME SHARING WHERE
$$\frac{A_{n+1} - A}{A - A_n} = \frac{1}{3}$$

INVENTOR.
JAMES L. LEESON, JR.
BY
Wolfe, Hubbard, Voit & Osann
ATTORNEYS.

Fig. 5b.

INVENTOR.
JAMES L. LEESON, JR.
BY
Wolfe, Hubbard, Voit & Osann
ATTORNEYS.

United States Patent Office 3,483,364
Patented Dec. 9, 1969

3,483,364
ELECTRICAL 3D CAM
James L. Leeson, Jr., Rockford, Ill., assignor to Woodward Governor Company, Rockford, Ill., a corporation of Illinois
Filed Sept. 12, 1967, Ser. No. 667,241
Int. Cl. G06g 7/26, 7/18, 7/28
U.S. Cl. 235—197
12 Claims

ABSTRACT OF THE DISCLOSURE

A system for producing an output signal which is an arbitrary function of two input signals each representing an independent variable. The respective input signals are individually applied to the inputs of a pair of interpolating systems, respective ones of which control rows and columns of a diode-resistor matrix. Successive rows and columns of the matrix correspond to successive discrete values of the two input signals, and current from a single source is driven through one or more diode-resistor branches of the matrix for time periods determined in response to the input signals by the interpolating systems so that the time integrals of the sum of the currents drawn by the conducting matrix branches closely approximates the arbitrary limit of the input signals.

Objects of the invention

The present invention relates in general to function generators and more particularly to function generators of the type which produce an output signal representative of the arbitrary function of a pair of independent variables.

It is a general object of the invention to replace a mechanical three-dimensional cam heretofore used to generate a signal representing an arbitrary function of two variables with a purely electrical system.

A more specific object of the invention is to produce a composite signal representing a function of a single independent variable for all values of the independent variable within a desired range with a limited number of signal generators, respective ones of which produce a signal which is a functon of the independent variable at successive discrete values thereof.

Another object of the invention is to derive a signal representing an arbitrary function of two independent variables for all values of the variables within desired ranges from the outputs of a limited number of signal generators, respective ones of which produce a signal representative of a function of the independent variables at different discrete preselected values thereof. Toward the attainment of this end, it is an object of the invention to interpolate between the outputs of a series of signal generators, each of which produces a signal representative of the value of a dependent variable at different discrete value of an independent variable.

Description of the drawings

Other objects and advantages will become apparent as the following description proceeds, taken in conjunction with the accompanying drawings in which:

FIG. 8b is a circuit diagram of a portion of the system shown in FIG. 5 with values being selected to produce an electrical output of which FIG. 8a is a mechanical analog.

While the invention has been shown and will be described in some detail with reference to a preferred embodiment thereof, there is no intention that it thus be limited to such detail. On the contrary, it is intended here to cover all modifications, alternatives, and equivalents falling within the spirit and scope of the invention as defined by the appended claims.

Background of the invention

In many control applications, it is necessary to produce an output signal which is an arbitrary function of two input signals, each of which represents an independent variable. For example, turbine engine controls for aircraft must limit fuel flow rate according to a function of engine r.p.m. and inlet temperature in order to prevent dangerous overheating of the engine blades. The arbitrary relationships between fuel flow rate on the one hand and engine r.p.m. and engine inlet temperature on the other hand is determined by the manufacturers of the engine. These relationships are established by a set of curves such as those illustrated in FIG. 1. Thus the first independent variable $a$ would represent increasing values of r.p.m., the dependent variable S would represent the maximum permissible rate of fuel flow for various values of engine r.p.m., and respective ones of the curves $b_0$, $b_1$, $b_2$, and $b_3$ would be for successively higher engine inlet temperatures, such as for example, 90°, 100°, 110°, and 120°. What is required in the turbine engine control is that an electrical signal be produced at all times representative of the maximum permissible rate of fuel flow (S in FIG. 1) for the existing values of engine r.p.m. and engine inlet temperature (the independent variables $a$ and $b$ in FIG. 1). This signal is then compared in the system at all times with another signal representative of the actual rate of fuel flow and means are also provided for preventing, on the basis of this comparison, the actual fuel flow rate from ever exceeding the safe limit.

A function generator of the type just described is also used in controls for stationary power systems of the type which includes a water-driven turbine and an electric generator driven by the turbine. Turbines of this type have water wheels with variable pitch blades, with the turbine blade angle being varied in accordance with the variations in demand for electric power from the generator. In addition to the first independent variable, namely the electric power supplied by the generator, a second independent variable also exists, this being the amount of water "head" available to drive the turbine. The greater the head, i.e., the amount of water pressure, the higher the water power available to the turbine. For any arbitrary combination of these two independent variables, required output power and available water head, there exists a unique turbine blade angle which will result in maximum efficiency. In such a system then, a family of curves such as that shown in FIG. 1 would exist with each curve being for a different head value $b_0$ through $b_3$ and with the value S representing turbine blade angle for increasing values of electric power generated, represented in FIG. 1 by $a$.

Figures 1, 2:
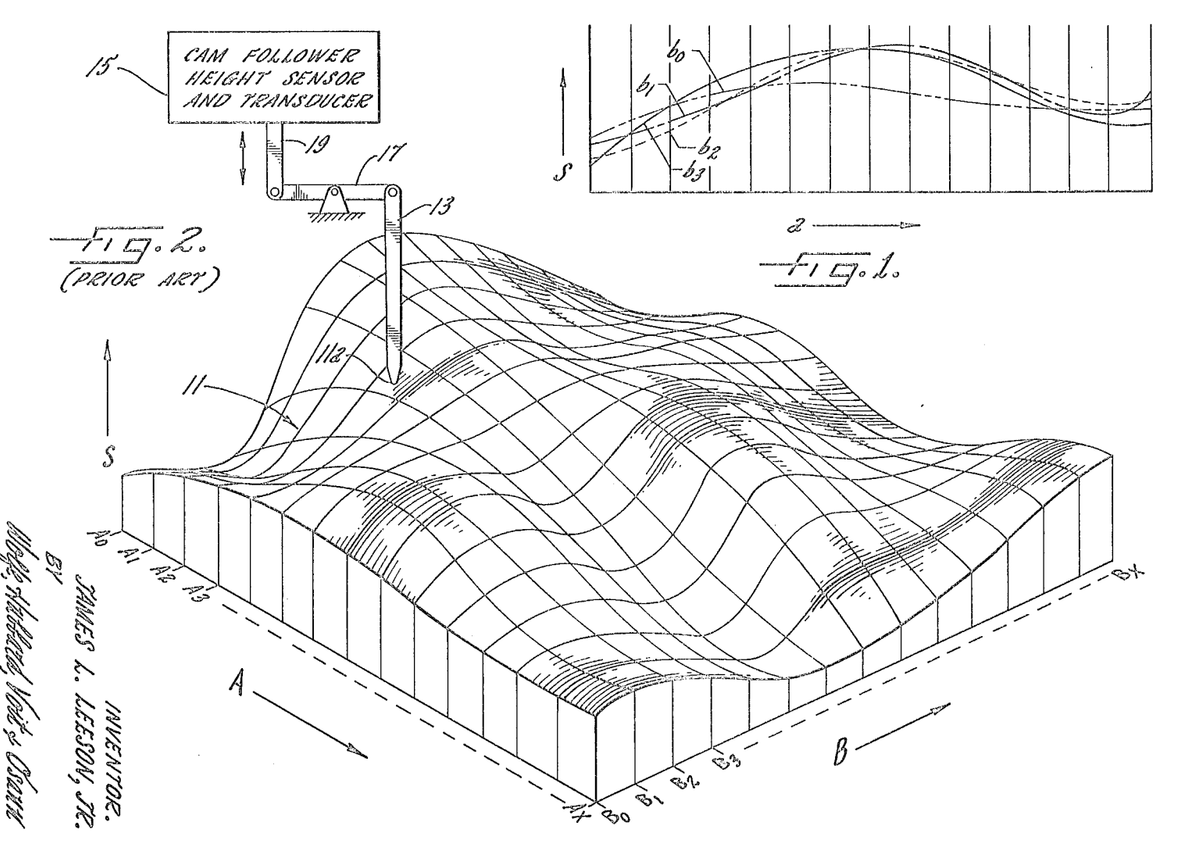
FIGURE 1 is a set of curves, each showing values of a dependent variable S plotted against values of a first independent variable $a$, with the different curves being for different values of a second independent variable $b$.
FIG. 2 is a mechanical three-dimensional cam of the type used by the prior art to generate an arbitrary function of two independently variable input signals.

To produce a signal representative of an arbitrary function of a pair of input signals representing two independent variables, existing systems incorporate a mechanical cam in the form of a cylinder having curves cut into its surface. A cam follower is mechanically coupled to a height sensor and electric transducer which is operative to produce an electric signal representative of the displacement of the follower by the cylindrical cam. The cam is displaced axially in proportion to a first input signal A representative of a first independent variable and is rotated in response to a second input signal B representative of a second independent variable. Such a cylindrical cam is illustrated in FIG. 2 but, for ease of illustration and better visibility of the entire cam surface, it is shown in an "unwrapped" form which results by simply cutting the cylindrical cam along a straight axial line and then straightening it until its inside surface is flat rather than cylindrical. Thus, while the cylindrical cams typically used would be rotated in response to varying values of the second input signal B, the equivalent flat-bottom mechanical cam 11 of FIG. 2 is shown as being translated in straight lines in mutually orthogonal directions in response to variations in the values of the two input signals A and B respectively.

Comparison of the mechanical cam 11 with the family of curves shown in FIG. 1 will reveal that the cam surface is so cut as to contain, for various values $B_0$, $B_1$, $B_2$, $B_3$ . . . $B_x$ of the second input signal B, the value of the dependent variable S for all values of the first input signal A. It will also be noted that the surface of the cam 11 is continuous so that similar curves of S versus A are produced for all values of B intermediate the discrete values, the first four of which are $B_0$ through $B_3$. As the cam 11 is translated in proportion to the magnitude of the signals A and B, the cam follower 13 is displaced vertically in accordance with the cam surface and actuates the cam follower height sensor and transducer 15 through appropriate linkages schematically shown as members 17 and 19 to produce a signal in accordance with the dimension of the cam 11 at the point of contact 11a with follower 13.

Figure 3A:
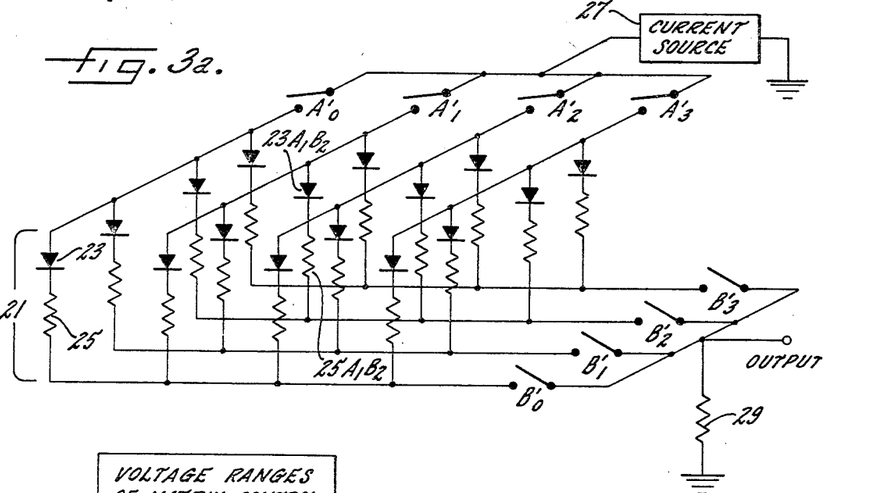
FIGS. 3a-c is a resistor matrix and its mechanical analog representing part of a system incorporating the present invention.

Mechanical three-dimensional cams of the type shown in FIG. 2 are difficult to make and are expensive. The present invention makes it possible to eliminate such cams and to replace them with purely electrical components. A simple electrical circuit illustrative of a basic part of a complete system embodying the present invention is shown in FIG. 3a and will be described briefly to aid in understanding the invention. In the circuit of FIG. 3a, an array of signal generators 21, each represented by a diode 23 and a resistor 25 in series therewith, is arranged in columns and rows, successive columns being associated with successive discrete values $A_0$, $A_1$, $A_2$, and $A_3$ of the first input signal A representing the first independent variable $a$ and with successive rows being associated with successive discrete values $B_0$, $B_1$, $B_2$, and $B_3$ of the second input signal B representing the second independent variable $b$.

Figures 3B, 3C:
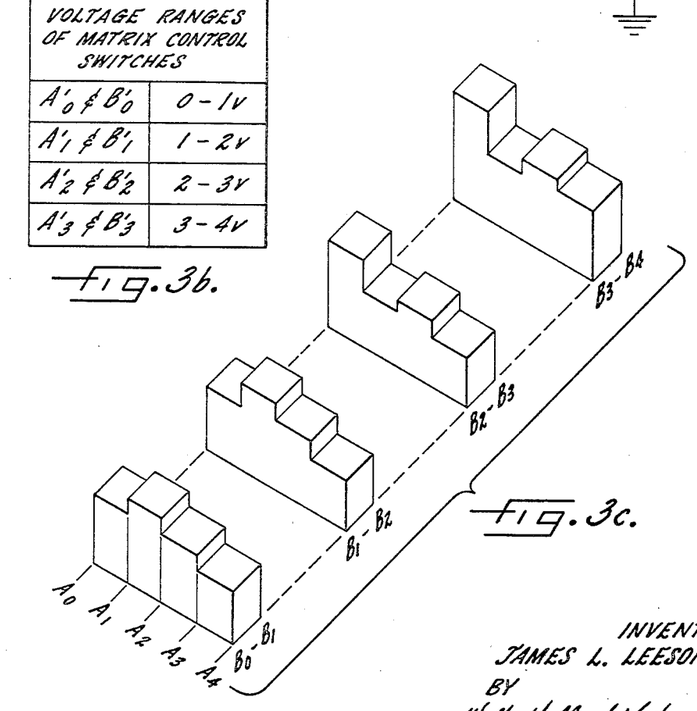

Through a series of four switches, labeled $A'_0$ through $A'_3$, successive columns of the diode-resistor branches 21 are connected at their diode ends to a source of current 27. Through a second series of switches $B'_0$ through $B'_3$, successive rows of the branches 21 are connected at their resistor ends to an output resistor 29 whose opposite end is connected to ground. By means not shown, each of the matrix control switches $A'_0$–$A'_3$ and $B'_0$–$B'_3$ is closed over a pre-assigned voltage range of an input signal representing the independent variable with which the switches are associated, as indicated in FIG. 3b. Thus, for example, if the value of the input signal A is between one and two volts and the value of the input signal B is between two and three volts, the switches $A'_1$ and $B'_2$ will be closed and current will flow from the current source 27 through switch $A'_1$, diode $23A_1B_2$, resistor $25A_1B_2$, switch $B'_2$ and the current summing resistor 29 to ground. The purpose of the diodes 23 is to prevent the existence of sneak circuits through unselected branches. The combined resistance of the diode 23 and resistor 25 of each branch 21 is so selected that the voltage drop established across the output resistor 29 by current conducted through the branch is representative of the value of the dependent variable of A and B for selected values of the independent variables A and B within the voltage ranges in which the control switches A' and B' associated with the column and row of the branch are closed. For example, if a five volt signal is to be produced to represent the value of the dependent variable when the signals A and B fall within one and two volts and two and three volts respectively, then the combined resistance values of the diode $23A_1B_2$ and its associated resistor $25A_1B_2$ would be selected to cause the current driven through the output resistor 29 when the switches $A'_1$ and $B'_2$ are closed to be such as to produce a five volt drop across the output resistor 29.

Figure 4A:
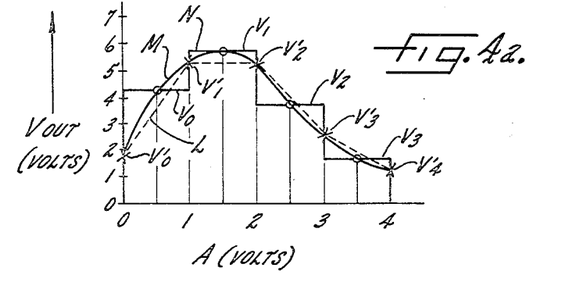
FIG. 4a is a set of curves comparing the output obtainable with the circuit of FIG. 3a with the output obtainable with a system incorporating additional features of the present invention.

FIG. 4a illustrates the manner in which the circuit shown in FIG. 3a operates. It contains three curves M, N, L, of voltage V, representing the dependent variable S, against increasing values of the input signal A for a given value of the input signal B. Curve M is the ideal value of the voltage V, such as would be produced by the electro-mechanical system of FIG. 2. As the input signal A varies from zero volts to four volts, successive ones of the control switches $A'_0$–$A'_3$ are closed, and as they close, current is driven through the output resistor 29 through successive ones of the diode-resistor branches 21. The resistance values of the respective branches 21 are so selected that the voltage output across the resistor 29 equals the ideal voltage output, as represented by the curve M, at the midpoint of the range associated with the switch A' controlling current through the particular branch. The resulting output voltage, then, is shown as the curve N in FIG. 4a and is seen to have four discrete levels for the four voltage ranges associated with the control switches $A'_0$–$A'_3$.

With the sixteen branch matrix illustrated in FIG. 3a only sixteen discrete voltage values representative of a dependent variable can be produced. An analogous mechanical cam is shown in FIG. 3c. It corresponds to the lower left-hand corner of the mechanical cam illustrated in FIG. 2 and readily shows the shortcoming of a simple circuit such as that shown in FIG. 3a: the dependent variable is represented by a single, fixed value signal (or by a surface in FIG. 3c) over a range of values for the input signals A and B although the actual value of the dependent variable might change significantly within that range.

General description of the invention

An improvement might be effected by increasing the number of individual branches 21 in the circuit of FIG. 3a so as to approximate more closely the correct value of the dependent variable, i.e. the output signal, for values of the input signals A and B. It is apparent, however, that the number of branches 21 and control switches A' and B' that would be required to produce an electrical system which would be even nearly as accurate as the mechanical cam of FIG. 1 would soon be so large as to make the device impractical because of its cost, complexity, and lack of reliability. The present invention makes it possible to approximate the accuracy of a mechanical cam of the type shown in FIG. 2 with a limited number of matrix branches by interpolating between the signals produced by individual ones of them.

Figure 4B:
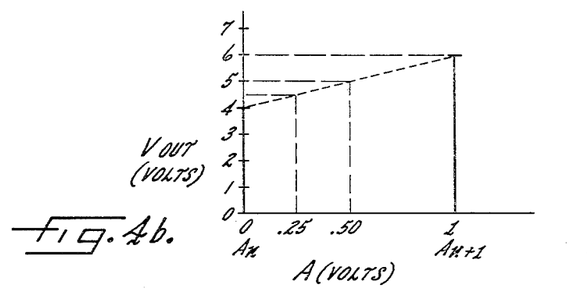
FIGS. 4b-d are graphs illustrating in a general manner the theory of operation of the present invention.

To illustrate the principle involved, such a process of interpolation will be discussed first with reference to producing a signal with represents a dependent variable of a single independent variable. Referring to FIG. 4b, let it be assumed that, by means of a matrix of the type shown in FIG. 3a but having a single row of diode-resistor branches 21, a series of voltage outputs are produced for successive discrete values of an input signal A representing an independent variable $a$. Specifically, let it be assumed that, by means of a first diode-resistor branch 21, a four volt output signal is produced across the output resistor 29 and that, by means of a second diode-resistor branch 21, a six volt output signal is similarly produced, these signals accurately representing the desired value of the dependent variable S of A when the input signal A is zero volts and one volt respectively. In accordance with the invention, there is derived from the two branches, which respectively produce the four volt and six volt output signals, a composite output signal for all values of A between zero volts and one volt, with the composite output signal gradually varying from four volts to six volts as the value of the independent variable signal A varies from zero volts to one volt. By reference to FIG. 4a, it is apparent that if the process is similarly performed for the higher values of A, the resulting output voltage, represented by the curve L, will be a much closer approximation to the ideal output voltage represented by the curve M than the voltage waveform N which would be produced by the circuit of FIG. 3a without interpolation.

Figure 4C:
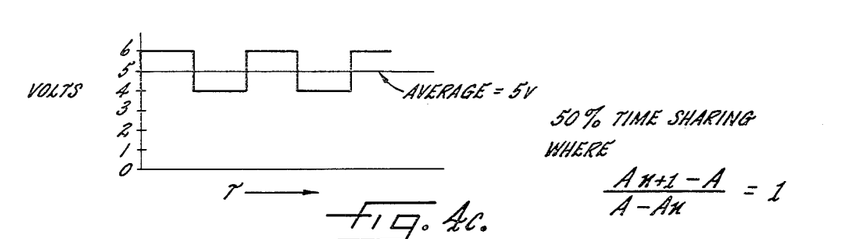
Figure 4D:
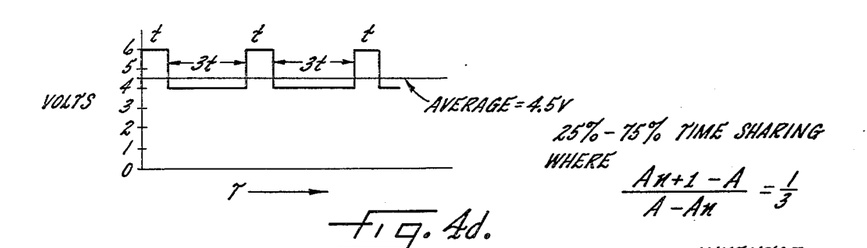

In accordance with an important feature of the invention, the process of interpolation is performed by interlacingly time-sharing the outputs produced by the branches 21 in varying proportions, with the length of time during which current is routed through the first branch 21 being inversely proportional to the difference between the actual value of the independent variable signal A and the value of A for which it accurately produces the dependent variable output signal. For example, it the value of the independent variable signal A falls halfway between zero and one volt, each of the branches 21 associated with those values will be connected between output resistor 29 and the current source 27 for equal time periods, as illustrated in FIG. 4c. The total current flowing through the output resistor 29 would then be averaged by a suitable integrating device resulting in a net output of five volts. Similarly, to produce an output signal representative of the dependent variable when the independent variable input signal A is .25 volt, or a quarter of the way between zero and one volt, respectively represented by the first and second of the branches 21 under discussion, the first branch 21 would be caused to conduct for a quarter of the time and the second branch would be similarly connected for three quarters of the time; the resulting average current through the output resistor 29 would produce a voltage drop of 4.5 volts which, by reference to FIG. 4b, is seen to be the correct interpolated dependent variable signal for $A=.25$ volt. Stated in more general terms, interpolation through time-sharing of a pair of current conducting branches, respective ones of which conduct current to an output resistor at successive discrete values of an independent variable input signal A, is according to the relationship $$\frac{T_1}{T_2} = \frac{A_{n+1} - A}{A - A_n}$$

where A is the actual value of the independent variable input signal, $A_n$ is the nearest discrete value below, and $A_{n+1}$ is the nearest discrete value above the actual value of the signal A, and $T_1$ and $T_2$ are the times during which the respective current conducting branches 21 associated with the first and second discrete values respectively are connected in series with the output resistor.

Detailed description of a system incorporating the invention

A system for performing interpolation through time-sharing according to the above relationship forms an important part of the present invention and is disclosed in FIG. 5 as part of a system for producing an output signal representing an arbitrary function of two independently variable input signals A and B. The system disclosed in FIG. 5 includes an array, or matrix, 30 of signal generators similar to that shown in FIG. 3a. As in FIG. 3a, each of the signal generators 21 is comprised of a diode 23 connected in series with a resistor 25. They are arranged in columns and rows respectively corresponding to successive discrete values $A_0, A_1, A_2, \ldots A_x$ and $B_0, B_1, B_2, \ldots B_x$ of the first and the second of the pair of independently variable input signals A and B. Through successive signal generator enabling means, in this instance a series of transistor switches 31, the diodes of successive rows of the signal generating means 21 are connected to an output resistor 33 whose opposite end is connected to one output of a source of current 35. Through a second series of signal generator enabling control means, shown as a series of transistor switches 37, the resistors of the successive column of signal generator 21 are connected to a second output of the current source 35 shown as ground. Current may be caused to flow from the current source 35 through the output resistor 33 in series with any desired one of the branches 21 by applying an enabling signal to the pair of switching transistors 31, 37 which are connected to the row and column containing the branch.

Figure 5A:
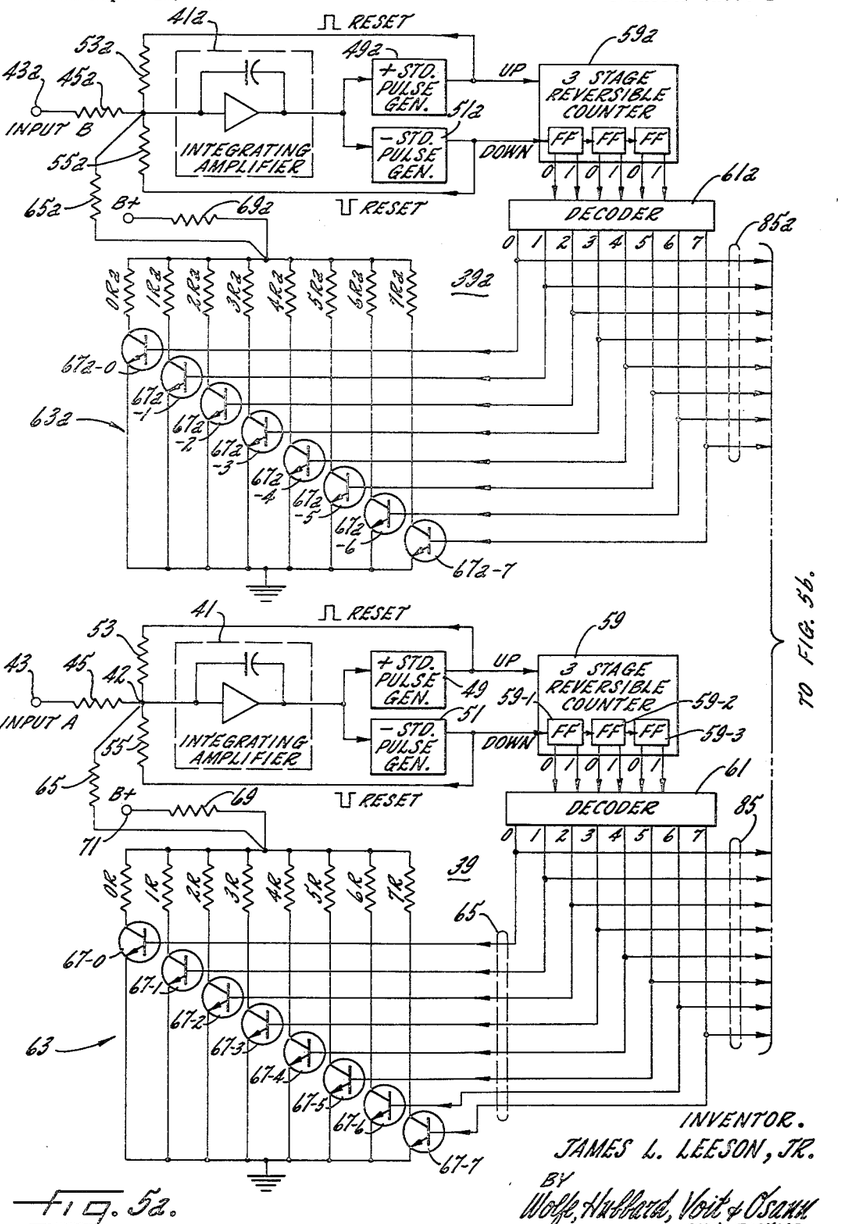
FIG. 5, formed of FIGS. 5a-5b when joined as indicated thereon, is a circuit diagram partly in block form embodying features of the present invention.
Figure 5B:
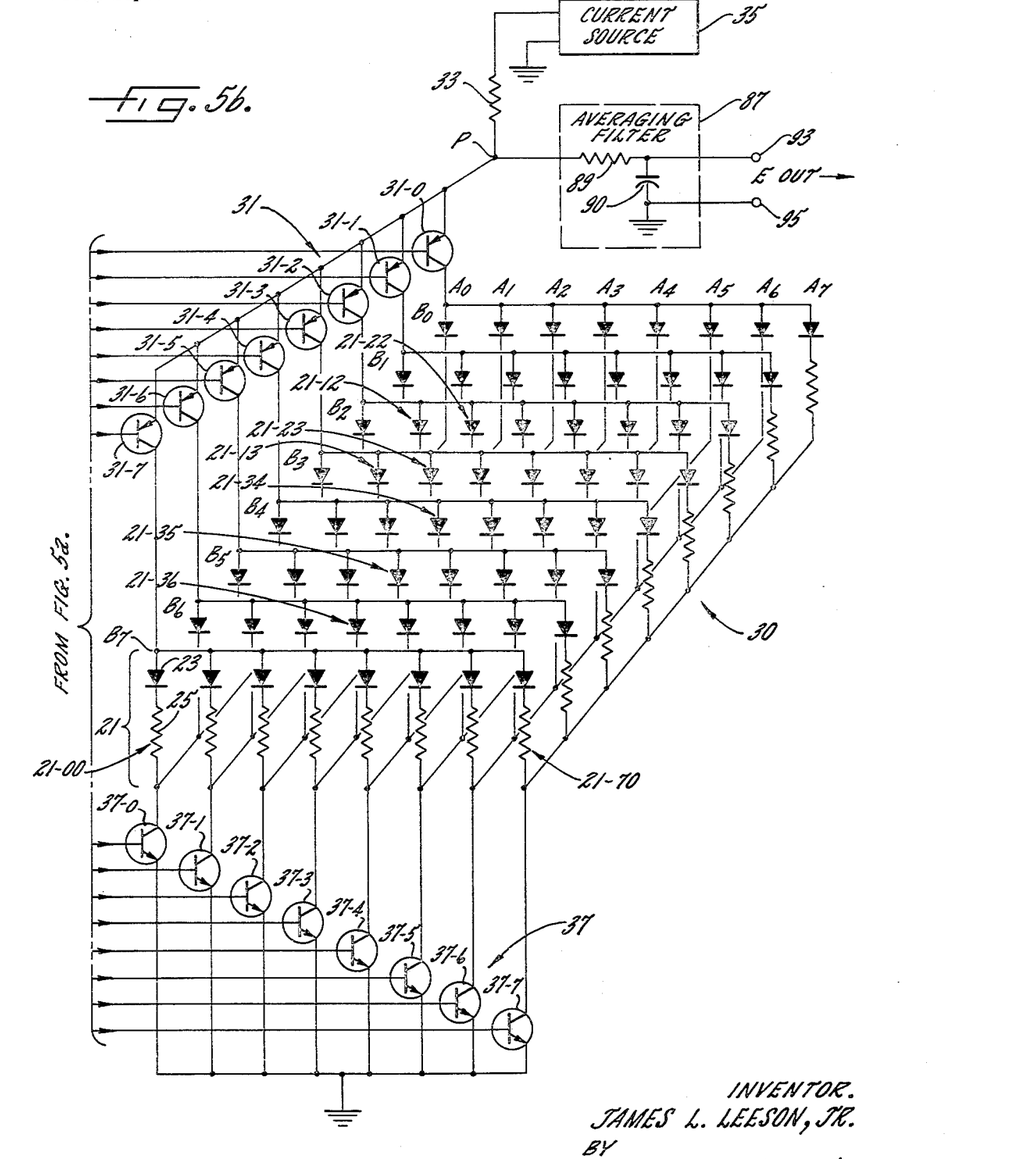

It will be helpful at this point to observe the mutually analogous nature of the matrix branches 21 of FIG. 5b and the prior art mechanical cam of FIG. 2. Since successive columns of the diode-resistor branches 21 correspond to successive values of A and successive rows correspond to successive values of B, it is seen that each individual branch 21 corresponds to an intersection of a pair of curves on the surface of the cam 11. Differently stated, the total resistance value of each branch 21 is made such that it is operative to produce, when its column and row are concurrently enabled by closure of their associated transistor switches 37 and 31, a signal in the form of a voltage drop across the output resistor 33 whose value is the arbitrary function of the input signals A and B at their discrete values corresponding to the column and row containing the branch. For example, if it be assumed that the diode-resistor matrix of FIG. 5b is to produce an output signal which is a function of the input signals A and B over the range in which the mechanical cam 11 of FIG. 2 operates, it follows that the resistance values of the successive branches 21 contained in the bottom row of the matrix are such that they will individually produce across the output resistor 33, when connected in series therewith, signals which correspond to the height of the cam 11 at the points which will be brought directly below the cam follower 13 when the input signal B is $B_0$ and the input signal A assumes successive discrete values equal to $A_0, A_1, A_2 \ldots A_x$. Similarly, the second from the bottom row of diode-resistor branches 21 of the matrix of FIG. 5b corresponds to the successive discrete values (heights) of the cam 11 at successive discrete values $A_0, A_1, A_2 \ldots A_x$ of the input signal A when the value of the input signal B is $B_1$.

In accordance with the invention, means are provided which, in response to the first input signal A, alternately enable the current switching means 37 connected to the two columns of matrix branches 21 corresponding to the nearest discrete value below ($A_n$) and above ($A_{n+1}$) the value of the input signal A for time periods $T_1$ and $T_2$ respectively, according to the relationship $$\frac{T_1}{T_2} = \frac{A_{n+1}}{A - A_n}$$

Means are also provided for alternately enabling, in response to the second input signal B, the current switching means 31 connected to the two rows of the matrix branches 21 corresponding to the nearest discrete value below ($B_n$) and above ($B_{n+1}$) the value of the input signal B for time periods $T_3$ and $T_4$ respectively according to the relationship $$\frac{T_3}{T_4} = \frac{B_{n+1}}{B - B_n}$$

In carrying out this aspect of the invention there are provided a pair of interpolating control systems 39 and 39a, respectively for effecting closing of the control switches 37 and 31 according to the relationships set forth above. Turning first to the control system 39, it includes integrating means 41, such as an integrating amplifier, which is operative to produce an output signal whose value is proportional to the time integral of a signal applied to its input. The input signal A is applied to the interpolating control system at its input terminal 43 and through a resistor 45, to the input 42 of the integrating amplifier 41. The input signal A may either be negative or positive but, for sake of the present discussion, will be assumed to be negative and is so shown as the waveform 45 in FIG. 6. Means are also provided for resetting the integrating means 41 to a zero output state when the output signal produced by it reaches a predetermined value of either the same polarity as the input signal A (hereinafter referred to as "a first-polarity signal"), or a signal of the opposite polarity (to be referred to as "an opposite-polarity signal"). In the illustrative embodiment, a pair of threshold voltage sensitive standard pulse generating devices 49 and 51, are provided for this purpose.

Each of the devices 49 and 51 may consist of conventional components, such as a Schmitt trigger (for establishing a threshold voltage) and a one-shot multivibrator (for producing a pulse of standard height and width), with the output of the trigger circuit being applied to the input of the one shot. One of the devices, 49, labeled "+standard pulse generator," has its input connected to the output of the integrating amplifier 41, its output connected through a summing resistor 53 to the input 42 of the integrating amplifier, and is operative to apply an opposite-polarity pulse thereto when the signal at the output of the integrating amplifier reaches a predetermined opposite-polarity voltage level, chosen in the exemplary embodiment to be +10 volts. The second one shot, 51, labeled "—standard pulse generator," has its input also connected to the output of the integrating amplifier 41, its output connected through a second summing resistor 55 to the input 42, and is operative to apply a first-polarity pulse thereto when the voltage level at the output of the integrating amplifier 41 reaches a predetermined first-polarity voltage level, shown as —10 volts. The size of the threshold voltage is immaterial so long as the threshold voltages at which the +one shot 49 and the —one shot 51 fire are the same. Furthermore, once the firing threshold of the resetting devices 49 and 51 is determined, then to assure that the output of the integrating amplifier 41 is reset to a zero output level, the pulse length produced by them should, in accordance with the present invention, be selected so that their volt-second contents are equal to the volt-second content of the input to the integrating amplifier 41 up to the instant when the resetting device is triggered.

Figure 6:
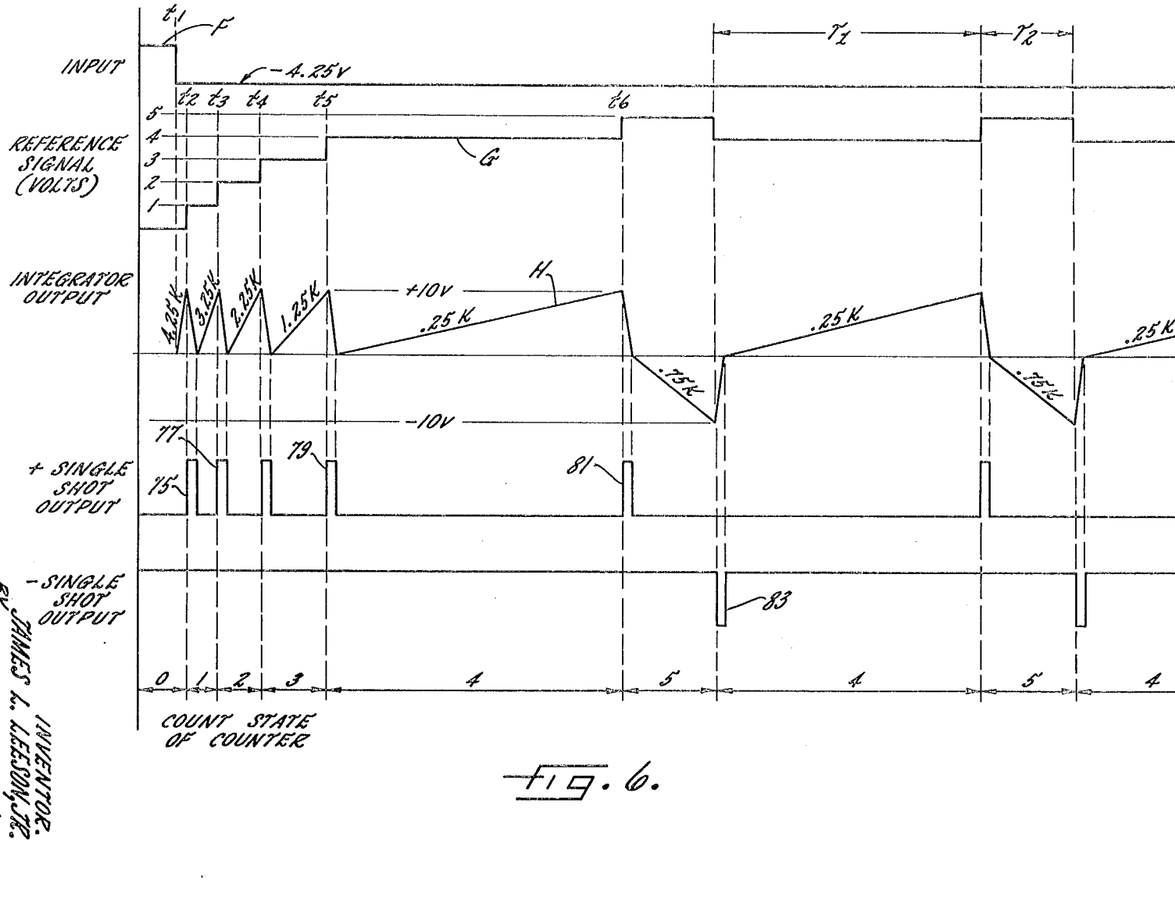
FIG. 6 is a set of waveforms illustrating voltages produced by the system shown in FIG. 5.

By means to be described hereinafter, the output voltage of the amplifier 41 is caused to reach the threshold level of the reset device 51 only after it has reached the threshold level of the reset device 49 one or more times. The waveform H in FIG. 6 is typical of the cycling of the output of the integrating device 41. In utilizing the cycling output of the integrating device 41, it is important to determine the number of times that its output reaches the predetermined opposite-polarity voltage value to which the reset device 49 is responsive, less the number of times that the output of the integrating device reaches the first-polarity predetermined voltage value, sensed by the reset device 51. Toward this end, a registering means is provided, having a first input which, when energized by an input signal, causes the count state of the registering means to increase by one, and a second input which, when similarly energized, causes the count state of the registering means to diminish by one. A signal is then applied to the first input of the registering means every time the output of the integrating device 41 reaches the predetermined voltage value of the second polarity and a signal is applied to the second input of the registering device every time that the output of the integrating device 41 reaches the predetermined voltage value of the first polarity. Furthermore, the registering device also signals, at a plurality of outputs, the net accumulated count which is stored therein for utilization by the rest of the system. In the exemplary embodiment this registering and signaling function is performed by a reversible binary counter 59 having an UP input terminal connected to the output of the +standard pulse generator 49 and a DOWN input similarly connected to the output of the —standard pulse generator 51. Reversible binary counters are well known and typically contain a series of cascaded flip flops whose number is determined by the desired count capacity. The counter 59 is shown as having three flip flops, 59–1, 59–2, and 59–3, for an eight count capacity. The six outputs of the flip flops 59–1, 59–2, and 59–3 form the plurality of outputs of the registering device at which the net count accumulated in the device is signaled in binary form as a combination of logic 0 and logic 1 voltage levels, each combination representing a different accumulated count. A binary counter of the type shown is particularly suitable for registering and signaling the difference between the number of times that the output of the integrating amplifier 41 reaches the predetermined voltage value of the opposite polarities. Furthermore, the reset devices 49 and 51, shown as one-shot pulse generators, are also well adapted for applying a signal to the inputs of the binary counter 51 every time the output of the integrating amplifier 41 reaches one or the other of the predetermined voltage levels. It will be recognized, however, that other accumulating and signaling devices could be used in place of the binary counter 59 to perform this function and that the signals for changing the count state of the registering device 59 need not be derived from the output of the resetting devices 49 and 51, but could be derived from separate threshold sensitive devices. Thus, a second +standard pulse generator could be connected between the output of the integrating amplifier 41 and the UP input of the registering device 59, and a second —standard pulse generator could be connected between the output of the integrating device 41 and the DOWN input of the registering device 59.

As just stated, the net accumulated count of the binary counter 59 is signaled at its outputs in binary coded decimal form. In the preferred embodiment shown in FIG. 5 this output is converted into pure decimal form by a binary to decimal decoder 61 having a series of output terminals labeled 0 through 7. As the net accumulated count signaled at the output of the binary counter 59 changes from 0 through 7 a unique voltage level appears at successive ones of the outputs of the decoder 61. Binary to decimal decoders are well known in the art and it is sufficient to note that the unique voltage level which appears at successive ones of the outputs of the decoder to signal the count states 0, 1, 2, etc., of the counter 59 may be either positive or negative relative to the voltage level existing at that time on the other outputs of the decoder. In the preferred embodiment the decoder output is used to provide a turn-on signal to one of the transistor switches 37, and, since they are of the NPN type, the unique voltage level for turning one of them on should be positive.

Because of the close cooperation of the counter 59 and the decoder 61, they may be considered as constituting a single means for signaling at successive outputs, those of the decoder 61, the number of times the output of the integrating device reaches the second polarity voltage level less the number of times that it reaches the first polarity voltage level and they are so referred to in certain ones of the claims.

Forming an additional part of the interpolating system 59 is a signal generating means 63 for applying an opposite-polarity reference signal to the input of the integrating device 41. Furthermore, in accordance with the invention, the reference signals produced by the generating means 63 has a successively larger predetermined voltage value, shown as the waveform G in FIG. 6, for each successively higher net count signaled by the registering means comprised of the counter 59 and the decoder 61. The signal generating means 63 has a plurality of inputs and is made responsive to the count state signaled at the outputs of the decoder 61 by connecting these inputs to the outputs of the decoder through a plurality of lines 65. To apply the output of the reference signal generating device 63 to the input of the integrating device 41, a summing resistor 65 is connected between the output and the input of the respective devices.

A particularly suitable and simple arrangement for the reference signal generator 63 is illustrated in FIG. 5a. It comprises a plurality of voltage dropping or load resistors, respectively labeled 0R, 1R, 2R, 3R, . . . 7R and individually connected through respective ones of a series of transistor switches 67 through a common current limiting resistor 69 across the outputs of a current source shown respectively as the B+, terminal 71, and ground. In particular, each of the transistors 67 has its collector connected to its associated voltage dropping resistor 0R–7R, its emitter connected to ground, and its base connected to respective ones of the outputs 0–7 of the decoder 61 so that as signals are produced at successive outputs of the decoder 61, successive ones of the switching transistors 67 complete a path from the current source terminal 71 through successive ones of the resistors 0R through 7R to ground. In order to cause the generator 63 to produce a reference signal whose value increases as successive ones of the transistors 67 are turned on by signals from the decoder 61, the resistors 0R through 7R have individually selected, ascending, resistance values so that as current is drawn through successive ones of them, the resulting voltage drop constituting the reference voltage produced by the generator will increase in steps. In the particular system shown, the reference signal produced by the generator 63 changes in equal increments in response to each unit change in the count state of the counter 59. Furthermore, for sake of illustration, each of the increments is one volt. Thus, as the count state of the counter increases from 0 through 7, the transistors 67 associated with successive ones of the voltage dropping resistors 0R through 7R are rendered conductive and a voltage of 0, 1, 2, 3, 4, 5, 6, and 7 volts is produced by the generator 63.

Operation of the interpolating system 39 is independent of the rest of the system shown in FIG. 5 and will be forth briefly with reference to FIG. 6. Let it be assumed that at the time $t_1$ the input signal A changes from 0 volts to −4.25 volts. In a manner normal to the operation of integrating amplifiers, the output of the device 41 rises linearly from 0 volt toward +4.25 volts at a rate which is proportional to the magnitude of the input, in this instance 4.25. This is indicated by the slope of the first portion of the waveform H representing the output of the integrating amplifier 41. The output voltage has a polarity which is opposite to that of the input signal A (i.e., it is positive) and continues to increase in value until, at time $t_2$, it reaches the firing threshold of the +reset device 49, which may be assumed to be +10 volts. In response, the +reset device 49 produces an opposite-polarity (positive) reset pulse. The duration of the positive reset pulse and its magnitude are so selected that the volt-second content of the pulse equals the volt-second content of the input signal A over the time period during which the voltage rose from 0 volts to +10 volts. Consequently, the integrating amplifier 41 is reset and its output is returned to zero at the end of the first reset pulse 75. It should be noted again that selection of +10 volts as the firing threshold of the +reset device 49 is not critical so long as the relationship between volt-second content of the input to the integrating amplifier 41 in the manner just set forth is observed.

The output pulse 75 of the +reset device 49 is also applied to the UP input of the reversible counter 59, causing its count state to change from zero to one. The new count state of the counter is signaled in binary form at its outputs and also at the "1" output line of the decoder 61, causing current to flow through the 1R voltage dropping resistor of the reference signal generator 63 due to conduction by its associated transistor 67–1. As a result, a reference signal of +one volt is applied through the resistor 65 to the integrating amplifier input 42 as shown by the reference signal waveform G in FIG. 6. The net input applied to the integrating amplifier 41 is now −3.25 volts and it is at a rate of 3.25K, proportional to the new reduced input voltage, that the output voltage appearing at the output of the integrating amplifier 41, and shown as the second positive slope on the curve H, increases.

The time taken for the output voltage of the integrating amplifier 41 to reach the +10 volts threshold of the +standard pulse generating reset device 49 will be somewhat longer than during the previous excursion due to the reduced slope. Nevertheless, the threshold is reached, at time $t_3$, and in response thereto, the +reset device 49 produces a second positive reset pulse 77. In response to this pulse, in a similar manner to that related with reference to the first reset pulse, the output of the integrating amplifier 41 is again reset to zero and the count state of the counter 59 is increased from 1 to 2. The new count state is signaled at the "2" output of the decoder 61, turning on the switching transistor 67–1 and establishing a two volt drop across the resistor 2R which again is applied through the resistor 65 to the input 42 of the integrating amplifier 41.

Without repeating in detail the next three cycles of the system 39 it may be seen from FIG. 6 that during successive ones thereof, beginning at times $t_3$, $t_4$, and $t_5$, the net input to the amplifier 41 is reduced to −2.25 volts, −1.25 volts, and finally −.25 volt as the count state of the counter 59 is increased through 2, 3 and 4. Each cycle is longer than the preceding one due to the consistently lower rate of change (2.25K, 1.2K, 0.25K) of the integrating amplifier output voltage H. Thus, after the fourth positive reset pulse 79, the count state of the reversible counter 59 is 4, the reference voltage G fed back to the input of the integrating amplifier 41 is +4 volts, the net input voltage to the integrating amplifier is −.25 volt, and the time taken for the integrating amplifier output signal H to rise from zero volts to the threshold level of +10 volts is inversely proportional to the slope, .25K, of the waveform.

The sixth cycle of the system 39 begins at the instant $t_6$ when the integrating amplifier output voltage H reaches the threshold level of +10 volts, at which instant a fifth positive reset pulse 81 is applied to the input of the amplifier and also to the input of the reversible counter 59. As a result, the count state of the counter is increased to 5, the reference signal G is increased to +5 volts, and, significantly, the net input to the integrating amplifier changes in sign from negative to positive. This is because the +5 volt reference signal fed back to the input of the amplifier 41 is greater than the −4.25, the input signal applied to the input terminal 43. Consequently, the net input to the implifier is +.75 volt and the output voltage produced by the amplifier changes linearly from zero toward a negative voltage, i.e. toward a voltage of the same polarity as the input signal A, at a rate proportional to the net input voltage or .75K. In accordance with the invention, the input voltage to the amplifier 41 is left undisturbed until the magnitude of the output voltage of the amplifier, now negative, reaches the same predetermined voltage value as that for which the amplifier was reset after positive excursions of the output voltage therefrom. Accordingly, the threshold of the standard pulse generator 51 is set at −10 volts, and it produces a negative reset pulse 83 at the instant when the output voltage from the integrating amplifier 41 reaches −10 volts. The volt-second content of the negative reset pulse 83 is the same as the volt-second content of the positive reset pulses 75–81 so that it is effective to reset the integrating amplifier 41 to a zero output voltage level. Additionally, the negative reset pulse 83 is applied to the DOWN input of the reversible counter 59 and is therefore effective to reduce its count state by 1 from 5 to 4. As a result, a signal appears on the "4" output line of the decoder 61, rendering the switching transistor 67–4 conductive and re-establishing a +4 volt level for the reference signal G from the generator 63. This returns the voltage level of the net input applied to the integrating amplifier input 42 to +.25 volt so that at the termination of the reset pulse 83 conditions are the same as they were at the termination of the previous positive reset pulse 79. Consequently, provided that the input signal A to the system remains unchanged, the system will continue to cycle as shown in FIG. 6, with the count state of the reversible counter 59 alternating between 4 and 5.

It is important to observe that cycling of the system 39 is achieved by applying to the input of the integrating amplifier 41 a reference signal which is of the opposite polarity to that of the input signal A and which has a successively larger discrete value in response to a signal at successive ones of the decoder outputs 0–7. It is also important to note that, when the system comes to equilibrium, the counter 59 switches between those two of its count states which cause the signal generator 63 to produce a reference signal at the nearest discrete values below (4 volts) and above (5 volts) the absolute value of the input signal A (4.25 volts). As a result, during alternate cycles of the system, the net input to the integrating amplifier 41 reverses in sign. During the time period $T_1$, when the absolute value of the reference signal is less than that of the absolute value of the input signal A, the rate at which the voltage output of the integrating amplifier 41 changes is proportional to $A - A_n$, where $A_n$ is the voltage value of the reference signal at its nearest discrete value below the value of the input signal A. On the other hand, during time period $T_2$, when the absolute value of the reference signal is at its nearest discrete value above the value of the input signal A, that is, when that value is $A_{n+1}$, the rate at which the output voltage produced by the integrating amplifier 41 changes from zero in a negative direction is proportional to $A_{n+1} - A$. Therefore, it may be seen that the interpolating system 39 cycles in accordance with the relationship $$\frac{T_1}{T_2} = \frac{A_{n+1} - A}{A - A_n}$$

Summarizing the important features of the interpolating system 39, a series of discrete absolute voltage values $A_0$, $A_1$, $A_2$ are selected over a range of values $A_0 - A_x$ within which the input signal A is expected to vary. Means are provided to produce a reference signal at any one of the discrete values $A_0 - A_x$. Also provided are a set of outputs, each associated with a respective one of the voltage values $A_0 - A_x$. The system is operative to produce at each given one of its outputs an enabling signal coincidentally with the existence of the reference signal at the voltage level associated with the given output. Furthermore, the system is continually operative to alternate the value of the reference signal between two voltage levels, one being the nearest discrete value below ($A_n$) and the other being the nearest discrete value above ($A'_{n+1}$) the value of the input signal A and existing for time periods $T_1$ and $T_2$ respectively according to the relationship $$\frac{T_1}{T_2} = \frac{A_{n+1} - A}{A - A_n}$$

It follows, therefore, that the system 39 is operative alternately to produce, in response to the input signal A, an enabling signal at its output corresponding to the nearest discrete value below ($A_n$) and above ($A_{n+1}$) the value of the input signal A, for time periods $T_1$ and $T_2$ according to the relationship $$\frac{T_1}{T_2} = \frac{A_{n+1} - A}{A - A_n}$$

Returning now to a consideration of the matrix 30, it will be recalled that respective ones of its columns $A_0$ through $A_7$ correspond to successive discrete values of the independently variable input signal A. In accordance with an important feature of the invention, the transistor switches 37–0 through 37–7, respective ones of which are connected to the matrix columns corresponding to the discrete values $A_0 - A_7$, are individually connected to successive ones of the outputs 0 through 7, of the decoder 61 so that respective ones of the transistor switches 37–0 through 37–7 are enabled for conduction coincidentally with respective ones of the transistor switches 67–0 through 67–7 of the reference signal generator 63. Furthermore, in accordance with this aspect of the invention, the successive discrete voltage values of the signal produced by the reference signal generator 63 as the count state of the decoder 61 increases from 0 to 7 are selected to have the same absolute voltage values, i.e., absolute magnitude regardless of sign, as the successive discrete voltage values $A_0 - A_7$ to which respective ones of the columns of the matrix 30 are to correspond. As explained previously, the interpolating system 39 is operative to alternate the value of the reference signal, which it produces, between two voltage levels in accordance with the previously defined relationship $$\frac{T_1}{T_2} = \frac{A_{n+1} - A}{A - A_n}$$

with successive ones of the reference voltage levels existing coincidentally with successive ones of the count states of the counter 59. Therefore, since successive ones of the transistor switches 37–0 through 37–7 are enabled coincidentally with the existence of the reference voltage produced by the signal generator 63 at successive ones of its discrete values $A_0 - A_7$, it follows that the interpolating system 39 is also operative alternately to enable the two columns of the matrix 30 corresponding to the nearest discrete values below ($A_n$) and above ($A_{n+1}$) the value of the input signal A for time periods $T_1$ and $T_2$ respectively in accordance with the relationship $$\frac{T_1}{T_2} = \frac{A_{n+1} - A}{A - A_n}$$

In keeping with the invention and its object to produce a signal which is an arbitrary function of a pair of independently variable input signals A and B, means are also provided for alternately enabling the current switching means 31 connected to the two rows of the matrix branches 21 corresponding to the nearest discrete value below ($B_n$) and above ($B_{n+1}$) the value of the input signal B for time periods $T_3$ and $T_4$ respectively, according to the relationship $$\frac{T_3}{T_4} = \frac{B_{n+1} - B}{B - B_n}$$

The means for carrying out this aspect of the invention may be essentially identical to the interpolating system 39 and is so shown in FIG. 5a. The second interpolating system is identified by the reference numeral 39a and various ones of its component parts are identified with the same reference numerals as the corresponding parts of the interpolating system 39 but with the distinguishing suffix $a$ added. The outputs of the interpolating system 39$a$, formed of the outputs 0 through 7 of the decoder 61$a$, are connected to the bases of the transistor switches 31-0 through 31-7 individually by means of a plurality of connecting lines 85$a$. As in the case of the interpolating system 39, the resistance values of the resistors OR$a$ through 7R$a$ of the reference signal generator 63$a$ are selected so that when they are connected in series with the output resistor 69$a$ by means of their associated transistor switch 67$a$, the absolute value of the reference signal produced by the generator 63$a$ is equal to the respective voltage values $B_0$ through $B_7$ to which the rows of the matrix 30 are to respond. For sake of specific example, it may be assumed that the discrete values $B_0$ through $B_7$ to which successive rows of the matrix 30 correspond are separated by one volt increments and range from 0 to 7 volts; similarly to the values $A_0$ through $A_7$ for the independently variable input signal A.

If the value of the input signal A is exactly equal to one of the discrete values, say, $A_3$, shown as three volts for the exemplary embodiment, and if the value of the input signal B is also exactly equal to one of the discrete values, say, $B_4$, shown as four volts in the disclosed embodiment, the transistor control switches 37-3 and 31-4 will be continually enabled and current will flow through only one of the branches, 21-34, of the matrix 30, contained in the column and row associated with the values $A_3$ and $B_4$ and connected to the transistor switches 37-3 and 31-4. If, on the other hand, only one of the input signals, say, the signal A, has a value exactly that of one of the discrete values, such as $A_3$, and the value of the other input signal B is intermediate a pair of discrete values, such as $B_5$ and $B_6$, the transistor switch 37-3 will be continually enabled, but the transistor switches 31-5 and 31-6, respectively connected to the rows associated with the discrete values $B_5$ and $B_6$ of the input signal B will be enabled alternately and will cause current to flow alternately through a pair of branches in the matrix, both located in the column associated with the discrete signal value $A_3$, but respectively in the rows corresponding to the values $B_5$ and $B_6$ of the signal B. These are identified as 21-35 and 21-36. Finally, if both the input signal A and the input signal B fall between discrete voltage values, conduction will be through four branches of the matrix 30. Thus, assume that the value of the input signal A falls between $A_1$ and $A_2$ and that the value of the input signal B falls between $B_2$ and $B_3$. Under control of the interpolating system 39 the transistor control switches 37-1 and 37-2 will conduct alternately and similarly, under control of the interpolating system 39$a$, the transistor controlled switches 31-2 and 31-3 will be alternately enabled. As a result, conduction of current will be through the four branches 21-12, 21-22, 21-13, and 21-23 located in the $A_1$ and $A_2$ columns and in the $B_2$ and $B_3$ rows of the matrix.

To form a composite sum of the signals produced by the currents which flow through (up to) four branches of the matrix 30, in response to a pair of input signals to the system, all of the branches 21 of the matrix are connected to the current source 35 through the common output resistor 33 so that it acts to sum all of the currents flowing through the various branches concurrently. Additionally, means are provided for producing an output signal which is proportional to the average of the total current drawn through the summing resistor 33 by individual ones of the matrix branches 21. In the exemplary system, the averaging function is performed by a simple averaging or integrating filter 87, comprising a resistor 89 and a capacitor 90 connected in series with the output resistor 33 between the output terminals of the current source 35. The voltage appearing across the capacitor 89 is the time integral of the total currents drawn by the various branches of the matrix 30 from the current source 35 through the resistor 33 and is made available at a pair of output terminals 93 and 95 as the output signal of the system. In combination therefore, the resistor 33 and the filter 87 comprise a suitable means for producing an output signal which is proportional to the time integral or average of the sum of the signals (or currents) produced by respective ones of the signal generators represented by the branches 21 of the matrix 30.

Figure 7:
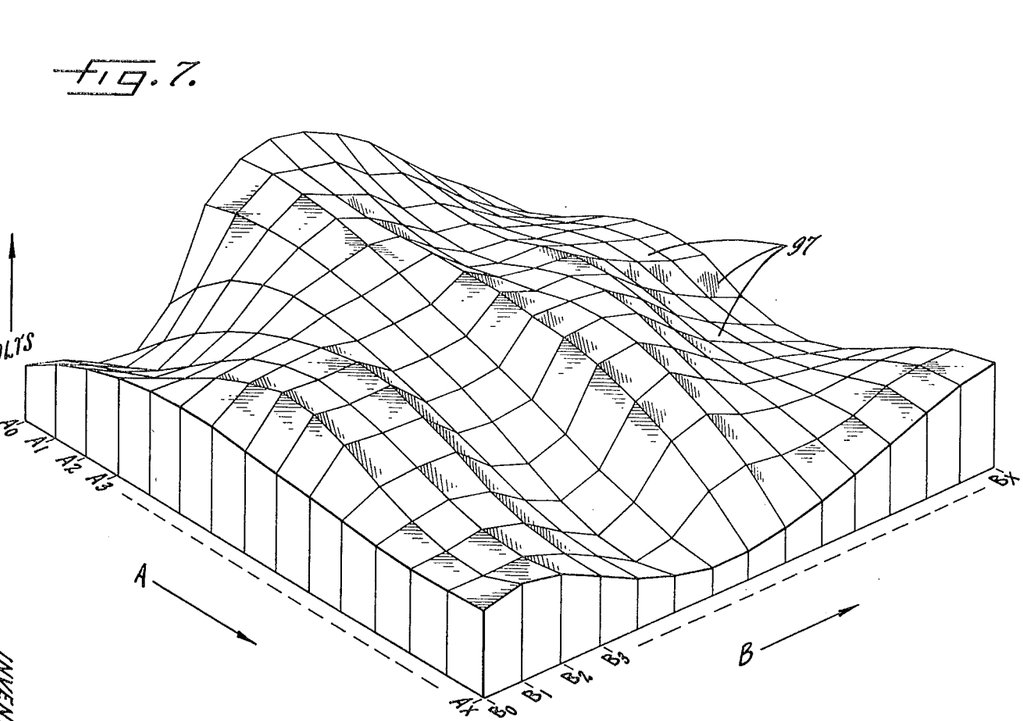
FIG. 7 is a mechanical analog of voltages produced by the system of FIG. 5, this analog being suitable for comparison with FIG. 3c.
Figure 8A:
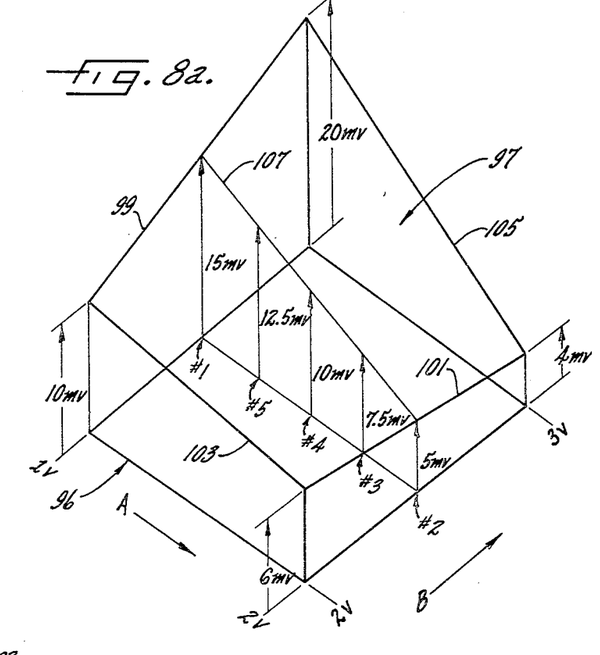
FIG. 8a is an illustration in detail of a facet of the type which forms a part of the mechanical analog of FIG. 7.
Figure 8B:
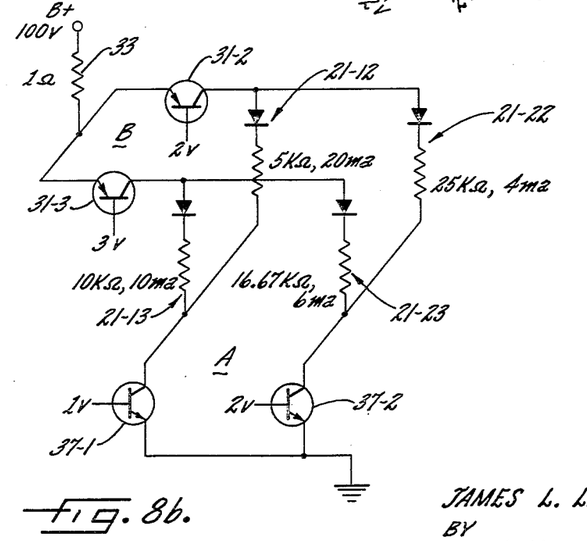

The output voltage produced by a system such as that shown in FIG. 5 as an arbitrary function of a pair of input signals A and B variable over the ranges $A_0$-$A_x$ and $B_0$-$B_x$ is shown in FIG. 7 for the same arbitrary function as that produced by the mechanical cam of FIG. 2. It will be seen that the signal produced by the electrical system approximates that produced by the electromechanical device very closely with the exception that, instead of a single smoothly curved surface, the surface representing the signal produced by the electrical system as shown in FIG. 7 consists of a large number of four-sided facets 97, the four corners of each facet corresponding to four values of the input signals A and B such, for example, as those to which the four matrix branches 21-12, 21-22, 21-13, and 21-23, shown in FIG. 5$b$ correspond. Each of the facets are substantially flat surfaces representing a three-dimensional graph or analog of the output signal produced by the system for various values of the input signals A and B within the values to which the four branches correspond. This aspect of the invention is better shown in FIGS. 8$a$ and 8$b$. FIG. 8$b$ shows the four matrix branches 21-12, 21-22, 21-13, and 21-23 randomly selected for sake of example from the matrix 30 of FIG. 5$b$. Also for sake of specific example, the current source supplying current to the matrix branches is assumed to have a hundred volt output potential, the output resistor 33 is shown as having a resistance of one ohm and the four branches 21-12, 21-22, 21-23 and 21-13 of the matrix have total resistance values of 5, 25, 16.67, and 10 kilohms respectively, selected to produce currents of 20, 4, 6, and 10 milliamps respectively through the output resistor 33, thus producing thereacross output signals of 20, 4, 6, and 10 millivolts respectively. These voltages are illustrated in FIG. 8$a$. They appear at the four corners of a block having a base 96 and a sloped top surface 97 which is a mechanical analog or three-dimensional graph of the output voltage produced in response to current flowing through the four matrix branches as the values of the input signals A and B vary between one and two volts and two and three volts respectively.

From the graph of FIG. 8$a$ it is seen that if the value of the input signal A is exactly one volt, the output voltage produced across the resistor 33 will vary from 10 millivolts to 20 millivolts along the line 99 as the value of the input signal B changes from two volts to three volts. If the value of the input signal A is two volts, then the output voltage across the resistor 33 will diminish gradually from 6 millivolts to 4 millivolts along the line 101 as the value of the input signal B increases from 2 volts to 3 volts. If, now, the value of the input signal B is assumed to be exactly 2 volts, the output signal across the resistor 33 will vary from 10 millivolts to 6 millivolts along the line 103 as the input signal A varies from 1 volt to 2 volts. Finally, if the input signal B is exactly 3 volts, the output signal will diminish from 20 millivolts down to 4 millivolts along the line 105 as the value of the input signal A increases from 1 volt to 2 volts. Each of the foregoing voltage variations along the lines 99, 101, 103, and 105 is produced by time-shared current conduction through a pair of the four matrix branches of FIG. 8$b$, the relative times of conduction between the pair of branches involved varying as the input signal varies.

Referring again to lines 99 and 101, it will be observed that at reference point No. 1, where the value of the signal A is one volt and that of the signal B is halfway between two and three volts, the output signal is halfway between ten and twenty millivolts, or fifteen millivolts. Similarly, referring to the line 101, it is seen that at reference point No. 2 where a value of the input signal A is two volts and that of the input signal B is 2.5 volts, the value of the output signal is intermediate four and six millivolts, or five millivolts. The output signals corresponding to the reference points No. 1 and No. 2 are produced by currents through the branches 21–12 and 21–13 for point No. 1, and by current through the branches 21–22 and 21–23 for reference point No. 2, in each instance, current conduction being on a fifty percent time-shared basis. In short, for both of the reference points No. 1 and No. 2, the output signal across the resistor 33 is produced by current conducted alternately through a pair of matrix branches. This was the case because one of the input signals, A, was at one of the discrete values, 1 and 2 volts respectively, and only the other of the input signals, B, was intermediate the pair of such discrete voltage values, 2 and 3 volts.

If, however, both of the input signals A and B are intermediate the discrete voltage values to which one of the rows and columns of the matrix 30 corresponds, then the signal produced across the output resistor 33 will result from conduction of current through all four of the matrix branches shown in FIG. 8b. This is illustrated by the reference points Nos. 3, 4, and 5 in FIG. 8a and by the corresponding points on line 107 illustrating the value of the output signal produced by the system when the input signal B is 2.5 volts and the input signal A varies from 2 volts down to 1 volt. Thus, at reference point No. 3, corresponding to input signal A=1.75 volts, the current switching transistors 31–2 and 31–3 will conduct on a fifty percent time-sharing cycle, that is, each will conduct half of the time so that, during the first portion of the cycle to which the transistors 31–2 and 31–3 are subjected by the interpolating control system 39a, the diodes of the branches 21–12 and 21–22 will be connected through transistor 31–2 to the resistor 33 and during the second half of the cycle, the diodes of the branches 21–13 and 21–23 will be connected to the resistor 33 through switching transistor 31–3. The other two switching transistors involved, 37–1 and 37–2, will be cycled on a twenty-five percent–seventy-five percent time-sharing cycle, with the transistors 37–1 connecting the resistors of the branches 21–12 and 21–13 to ground during the first twenty-five percent of each cycle and the transistor switch 37–2 connecting the resistors of the matrix branches 21–22 and 21–23 to ground during the remaining seventy-five percent of each cycle of the interpolating system 39.

In accordance with the invention, the average cycle times of the two interpolating systems 39 and 39a are approximately the same, but the systems operate independently of one another, are not synchronised, and random variations in their cycle times are purposely allowed to occur. The concurrent, but asynchronous cycling of the four switches associated with the four matrix branches in the manner just described results in the production of an output signal across the resistor 33 whose time integral has a value which falls on the plane 97 defined at its four edges by the lines 99, 101, 103, and 105. Therefore, at reference points Nos. 3, 4, and 5, as the value of the input signal goes through 1.75 volts, 1.5 volts, and 1.25 volts respectively, while the value of the input signal B is maintained at 2.5 volts, it is seen that the value of the output signal varies along the line 107 connecting the midpoints of the lines 101 and 99 and goes through 7.5 volts for the reference point No. 3, 10 volts for the reference point No. 4, and 12.5 volts for the reference point No. 5, respectively. In a similar manner, the output for any combination of values of the input signals A and B produced by the system may be determined by drawing a three-dimensional graph similar to FIG. 8a with the height of each corner being proportional to the nearest discrete values of the input signals A and B below and above the actual values of the signals and by scaling from the surface created by the four lines connecting the four vertical lines the height of the vertical line connecting the base 96 of the block and its top surface 97 for the specific values of A and B desired.

Although the invention finds its primary use in producing a function of two variables, it may also be incorporated as a system for producing a function of only one variable. This is indeed a part of the more elaborate system shown in FIGS. 5a and 5b, and includes the interpolating system 39, a single row of matrix branches 21, the switching transistors 37–0 through 37–7, the current source 35, the current summing resistor 33, and the integrating network 87.

Assuming, for example, that the seven branches 21–00 through 21–70 in the bottom row of the matrix 30 are selected, it will be seen that successive ones of the switches 37, in combination with the matrix branches 21 to which they are connected, comprise a series of signal generators, each having a control input, the base of the transistor, for rendering the signal generator operative in response to a control signal, received from one of the outputs of the decoder 61. Similarly, the successive resistors 0R through 7R of the reference signal generator 39 in combination with the particular one of the transistor switches 67–0 through 67–7 to which the resistor is connected comprise another series of signal generators, each of them also having a control input, the base of the transistor, for rendering the signal generator operative. Furthermore, successive signal generators of the two series of signal generators may be readily seen to form successive signal generator pairs, with the control inputs of the successive pairs of signal generators being individually connected to respective ones of the successive outputs 0–7 of the registering device comprising the counter 59 and the decoder 61. Thus, successive pairs of the signal generators are made concurrently operative in response to successively larger counts signaled at the outputs 0 through 7.

The output of one signal generator of each pair is then applied, in accordance with the invention as explained previously, to the input of the integrating amplifier 41, and the output of the other signal generator of each pair is applied to means, including the resistor 33, and the integrating filter 87, for producing a signal representing the time integral of the sum of the signals produced by all of the "other" signal generators of the several signal generator pairs. Finally, it will be observed that, in accordance with the invention as explained previously, the "one" signal generators of the successive pairs produce an opposite-polarity reference signal having a successively larger discrete value for each successively higher net count signaled by the registering device 59–61 and, significantly, that each of the "other" signal generators of the successive pairs (those formed of the transistor switches 37 and the matrix branches 21) produce a signal whose value represents the function of the input signal A at the value produced by the "one" signal generator of the pair.

From the foregoing it will be apparent that what has been described here represents a valuable contribution to the art of multi-function generators. By employing the principles of the invention, an output signal which is an arbitrary function of two independent variables, may be generated by purely electronic and electrical means. Costly mechanical cams are eliminated and in their stead mass produced components which lend themselves readily to miniaturization are used. Indeed, the "electrical cam" here described may be considered for certain applications to be superior to the prior art mechanical cam because the electrical cam has an adjustable "surface." Thus, by using rheostats for the resistors of the diode-resistor matrix, the contour of the "surface" generated by the system may be varied.

I claim as my invention:

1. A system for producing an output signal representing an arbitrary function of two independently variable input signals A and B comprising in combination:
   (a) an array of signal generators functionally arranged in columns and rows, successive columns and rows respectively corresponding to successive discrete values $A_0, A_1, A_2, \ldots A_x$ and $B_0, B_1, B_2, \ldots B_x$ of the first and the second of said input signals A and B and each generator producing, when its columns and row are concurrently enabled, a signal whose value is an arbitrary function of said input signals A and B at their discrete values corresponding to the column and row containing the generator,
   (b) means responsive to said signal generators for producing an output signal which is proportional to the time average of the sum of the signals produced thereby,
   (c) means responsive to the first input signal A for alternately enabling the two columns of said signal generators corresponding to the nearest discrete values below ($A_n$) and above ($A_{n+1}$) the value of said first input signal A for time periods $T_1$ and $T_2$ respectively according to the relationship
   $$\frac{T_1}{T_2} = \frac{A_{n+1} - A}{A - A_n}$$
   and
   (d) means responsive to the second input signal B for alternately enabling the two rows of said signal generators corresponding to the nearest discrete values below ($B_n$) and above ($B_{n+1}$) the value of said second input signal B for time periods $T_3$ and $T_4$ respectively according to the relationship
   $$\frac{T_3}{T_4} = \frac{B_{n+1} - B}{B - B_n}$$

2. A system for producing an output signal representing an arbitrary function of two independently variable input signals A and B comprising in combination:
   (a) a source of current having two output terminals,
   (b) current summing circuit means connected to one terminal of said current source for producing a signal which is proportional to the sum of currents flowing through said circuit means,
   (c) means responsive to said sum-proportional signal for producing an output signal which is proportional to the time average of said sum-proportional signal,
   (d) a matrix of resistors functionally arranged in columns and rows, successive columns and rows respectively corresponding to successive discrete values $A_0, A_1, A_2, \ldots A_x$ and $B_0, B_1, B_2, \ldots B_x$ of said input signals A and B,
   (e) a first plurality of current switching means individually connected between respective rows of said matrix resistors and said current summing circuit means,
   (f) a second plurality of current switching means individually connected between respective columns of said matrix resistors and the other output terminal of said current source,
   (g) each of said matrix resistors having a value selected to cause, when the two current switching means connected to its column and row are concurrently closed, a specific amount of current to be driven through said current summing means, said current having a value which is an arbitrary function of the two independently variable input signals A and B at their discrete values corresponding to the row and column containing the matrix resistor,
   (h) means responsive to the first input signal A for alternately enabling the current switching means connected to the two columns of said matrix resistors corresponding to the nearest discrete values below ($A_n$) and above ($A_{n+1}$) the value of said first input signal A for time periods $T_1$ and $T_2$ respectively, according to the relationship
   $$\frac{T_1}{T_2} = \frac{A_{n+1} - A}{A - A_n}$$
   and
   (i) means responsive to the second input signal B for alternately enabling the current switching means connected to the two rows of said matrix resistors corresponding to the nearest discrete values below ($B_n$) and above ($B_{n+1}$) the value of said second second input signal B for time periods $T_3$ and $T_4$ respectively, according to the relationship
   $$\frac{T_3}{T_4} = \frac{B_{n+1} - B}{B - B_n}$$

3. A system for producing an output signal representing an arbitrary function of two independently variable input signals A and B of a given polarity comprising in combination:
   (a) an array of signal generators functionally arranged in columns and rows, successive columns and rows respectively corresponding to successive discrete values of said input signals and each generator producing, when its column and row are concurrently enabled, a signal whose value is an arbitrary function of said input signals at their discrete values corresponding to the row and column containing the generator,
   (b) means responsive to said signal generators for producing an output signal which is proportional to the time average of the sum of the signals produced thereby, and
   (c) a pair of independent interpolating control systems, each having an input connected to receive a respective one of said input signals A and B and a plurality of signal generator enabling output circuits connected to successive ones of said rows and columns of signal generators respectively, each of said control systems additionally including:
      (1) integrating means, having an input, for producing an output signal whose voltage value is proportional to the time integral of a signal applied to said input,
      (2) means for resetting said integrating means to a zero output state at the instant when the output of said integrating means reaches a predetermined value of either said given polarity or of the opposite polarity,
      (3) count registering means, having a plurality of outputs, for signaling at said outputs, as a net accumulated count, the number of times that the output of said integrating means reaches said predetermined value of said opposite polarity less the number of times that the output of said integrating means reaches said predetermined value of the given polarity,
      (4) signal generating means responsive to said registering means for applying to the input of said integrating means an opposite polarity reference signal having a successively larger, predetermined discrete voltage value for each successively higher net count signaled by said registering means, and
      (5) means for actuating respective ones of said enabling output circuits in response to and for the duration of each successively higher net accumulated count signaled by said registering means.

4. A system for producing an output signal representing an arbitrary function of first and second independently variable input signals A and B having a first polarity, comprising in combination:
   (a) an array of signal generators functionally arranged in columns and rows, successive columns and rows respectively corresponding to successive discrete values of the first and the second of said independently variable input signals A and B and each generator producing, when its column and row are concurrently enabled, a signal whose value is an arbitrary function of said input signals A and B at their discrete values corresponding to the row and column containing the generator, (b) means responsive to said signal generators for producing an output signal which is proportional to the time average of the sum of the signals produced thereby, and (c) a pair of independent interpolating control systems, each having an input connected to receive a respective one of said input signals A and B and a plurality of signal generator enabling output circuits connected to successive ones of said rows and columns of signal generators, respectively, each of said control systems additionally including (1) an integrating amplifier having an input and an output, (2) first and second threshold voltage responsive pulse generating means each having an output coupled to the input of said amplifier and an input coupled to the output of said amplifier and set individually to produce a second-polarity pulse and a first-polarity pulse respectively in response to a predetermined second-polarity voltage level and a predetermined first-polarity voltage level respectively at said amplifier output, (3) a reversible binary counter having a count-up input coupled to the output of said first threshold voltage responsive pulse generating means, a count-down input coupled to the output of said second threshold voltage responsive pulse generating means, and a plurality of outputs, (4) a binary to decimal decoder having a plurality of inputs coupled to said counter outputs and a plurality of outputs, (5) signal generating means having an output coupled to the input of said amplifier and a set of inputs coupled to said decoder output for producing a second-polarity reference signal signal having a successively larger discrete value in response to a signal at successive ones of said decoder outputs, and (6) means for actuating respective ones of said signal generator enabling output circuits in response to and for the duration of signals at successive ones of said decoder outputs.

5. A system for producing an output signal which is an arbitrary function of two independently variable input signals A and B comprising in combination:

(a) an array of signal generators functionally arranged in columns and rows, successive columns and rows respectively corresponding to successive discrete values $A_0, A_1, A_2, \ldots A_x$ and $B_0, B_1, B_2, \ldots B_x$ of the first and the second of said independent variables A and B and each generator producing, when its column and row are concurrently enabled, a signal whose value is an arbitrary function of said input signals A and B at their discrete values corresponding to the row and column containing the generator, (b) means responsive to said signal generators for producing an output signal which is proportional to the time average of the sum of the signals produced thereby, (c) a pair of independent interpolating control systems, each system having an input connected to receive a respective one of said input signals A and B, and a plurality of enabling output circuits connected to successive ones of said rows and columns of signal generators respectively, each of said control systems additionally including:

(1) integrating means, having an input, for producing an output signal whose voltage value is proportional to the time integral of a signal applied to said input, (2) means for producing a second-polarity reset signal at the instant when the output of said integrating means reaches a predetermined second-polarity value, (3) means for producing a first-polarity reset signal at the instant when the output of said integrating means reaches a predetermined first-polarity voltage value, (4) means, having a first and a second input for receiving discrete input signals and a plurality of outputs, for registering and for signaling at said outputs, as a net accumulated count, the number of signals received at its first input less the number of signals received at its second input, (5) means for applying a signal to the first input of said registering means for each of said second-polarity reset signals, (6) means for applying a signal to the second input of said registering means for each of said first-polarity reset signals, (7) signal generating means responsive to said registering means for producing a second polarity reference signal having a successively larger, predetermined value for each successively higher net count signalled by said registering means, (8) means for adding said reference signal to said input signal so as to produce a net input signal to said integrating means, (9) means for adding said first-polarity and said second-polarity reset signals to said net signal, the volt-second content of each of said reset signals being equal the volt-second content of said net input signals, and (10) means for actuating respective ones of said enabling output circuits in response to and for the duration of each successively higher net count signalled by said registering means.

6. A system for producing an output signal representing an arbitrary function of an independently variable first polarity input signal, comprising in combination:

(a) an integrating amplifier having an input and an output, (b) first and second pulse generating means, each having an output coupled to the input of said amplifier, and an input coupled to the output of said amplifier, and set individually to produce a single second polarity pulse and a single first polarity pulse respectively in response to a predetermined second polarity voltage and a predetermined first polarity voltage level at said amplifier output, (c) means having a first and a second input respectively connected to the outputs of said first and second pulse generating means and a plurality of outputs, for registering and for signaling at respective ones of said outputs, as a net accumulated count, the number of pulses received at said first input less the number of pulses received at said second input, (d) a plurality of signal generator pairs, each of said signal generators having a control input for rendering said signal generator operative in response to a control signal and the control inputs of the signal generators of successive pairs being individually connected to respective ones of the successive outputs of said registering means so as to render successive pairs of said signal generators concurrently operative in response to successively larger accumulated counts signaled at said outputs, (e) means for applying the output of one of the signal generators of each pair of signal generators to the input of said integrating amplifier, (f) means responsive to the other signal generator of each pair for producing an output signal which is proportional to the time average of the sum of the signals produced by all of said other signal generators, said one signal generator of the successive generator pairs producing a second polarity reference signal having a successively larger discrete value for each successively higher net count signaled by said registering means, and each of said other signal generators of said plurality of generator pairs producing a signal whose value is the arbitrary function of said input signal at the value produced by said one signal generator of the pair.

7. A system for producing an output signal representing a predetermined function of an independently variable input signal, comprising in combination:
(a) an integrating amplifier having an input and an output,
(b) first and second threshold voltage responsive pulse generating means, each having an output coupled to the input of said amplifier and an input coupled to the output of said amplifier, and set individually to produce a second polarity pulse and a first polarity pulse respectively in response to a predetermined second polarity voltage level and a predetermined first polarity voltage level at said amplifier output,
(c) a reversible binary counter having a count-up input coupled to the output of said first threshold voltage responsive pulse generating means and a count-down input coupled to the output of said second threshold voltage responsive pulse generating means and a plurality of outputs,
(d) a binary to decimal decoder having a plurality of inputs coupled to said counter outputs and a plurality of outputs,
(e) signal generating means having an output coupled to the input of said amplifier and a set of inputs coupled to said decoder output for producing a second polarity reference signal having a successively larger discrete absolute value in response to a signal at successive ones of said decoder outputs,
(f) a plurality of signal generating means, each for producing a signal whose value is the prescribed function of said input signal at said successively larger discrete absolute values,
(g) means responsive to said signal generators for producing an output signal which is proportional to the time average of the sum of the signals produced by said signal generators, and
(h) control means connected between said decoder outputs and said signal generators for acutating respective ones of said generators individually in response to a signal at successive ones of said decoder outputs.

8. A system for producing an output signal representing a prescribed function of an independently variable first-polarity input signal, comprising in combination:
(a) integrating means, having an input, for producing an output whose voltage value is proportional to the time integral of a signal applied to said input,
(b) means for producing a second-polarity reset signal at the instant when the output of said integrating means reaches a predetermined second-polarity voltage value,
(c) means for producing a first-polarity reset signal at the instant when the output of said integrating means reaches a predetermined first-polarity voltage value,
(d) means, having a first and a second input for receiving discrete input signals and a plurality of outputs, for registering and for signaling at said outputs, as a net accumulated count, the number of signals received at its first input less the number of signals received at its second input, (e) means for applying a signal to the first input of said registering means for each of said second-polarity reset signal,
(f) means for applying a signal to the second input of said registering means for each of said first-polarity reset signals,
(g) signal generating means responsive to said registering means for producing a second-polarity reference signal having a successively larger, discrete magnitude value for each successively higher net count signaled by said registering means,
(h) means for adding said reference signal to said input signal so as to produce a net input signal to said integrating means,
(i) means for adding said first-polarity and said second-polarity reset signals to said net signal, the volt-second content of each of said reset signals being equal the volt-second content of said net input signals,
(j) a plurality of signal generators, respectively producing when actuated, a signal whose value is the prescribed function of said independently variable input signal at said successive, larger discrete magnitude values,
(k) means responsive to said signal generators for producing an output signal which is proportional to the time average of the sum of the signals produced thereby, and
(l) control means responsive to said registering means for actuating respective ones of said generators individually in response to and for the duration of each successively higher net count signaled by said registering means.

9. A system for producing an output signal representing an arbitrary prescribed function of a variable first-polarity input signal over a given voltage range comprising in combination:
(a) integrating means, having an input, for producing an output signal whose voltage value is proportional to the time integral of a signal applied to said input,
(b) means for resetting said integrating means to a zero state at the instant when the output of said said integrating means reaches a first predetermined value of either said first or of the opposite polarity,
(c) count registering means, having a plurality of outputs, for signaling at said outputs, as a net accumulated count, the number of times that the output of said integrating means reaches said predetermined value of opposite polarity less the number of times that the output of said integrating means reaches said predetermined value of first polarity,
(d) signal generating means responsive to said registertering means for applying to the input of said integrating means a second polarity reference signal having a successively larger discrete predetermined absolute voltage value for each successively higher net count signaled by said registering means.
(e) a plurality of signal generating means, each for producing a signal whose value is the arbitrary prescribed function of said variable input signal at said successively larger discrete absolute values.
(f) means responsive to said plurality of signal generators for producing an output signal which is proportional to the time average of the sum of the signals produced by said signal generators, and
(g) control means for actuating respective ones of said plurality of signal generators individually in response to, and for the duration of, each successively higher net count signaled by said registering means.

10. In a system for producing an output signal which is an arbitrary function of at least one independent first-polarity input signal over a given voltage range, an interpolating control comprising in combination:
(a) integrating means, having an input, for producing an output signal whose voltage value is proportional to the time integral of a signal applied to said input, (b) means for resetting said integrating means to a zero output state at the instant when the output of integrating means reaches a predetermined value of either said first or an opposite polarity, (c) count registering means having a plurality of outputs, for signaling at said outputs, as a net accumulated count, the number of times that the output of said integrating means reaches said predetermined value of opposite polarity less the number of times that the ouput of said integrating means reaches said predetermined value of first polarity, and (d) signal generating means responsive to said registering means for applying to the input of said integrating means a second polarity reference signal having a successively larger, predetermined voltage magnitude for each successively higher net count signaled by said registering means, the range of voltages which said signal generating means is capable of producing spanning the voltage magnitude range of said input signal for which said output signal is to be produced.

11. In a system for producing an output signal which is a prescribed function of a first polarity input signal representing an independent variable, an interpolating control system comprising in combination:

(a) an integrating amplifier having an input and an output, (b) first and second threshold voltage responsive pulse generating means, each having an output coupled to the input of said amplifier and an input coupled to the output of said amplifier, and set individually to produce a second polarity pulse and a first polarity pulse respectively in response to a predetermined second polarity voltage level and a predetermined first polarity voltage level at said amplifier output, (c) a reversible binary counter having a count-up input coupled to the output of said first threshold voltage responsive pulse generating means and a count-down input coupled to the output of said second threshold voltage responsive pulse generating means and a plurality of outputs, (d) a binary to decimal decoder having a plurality of inputs coupled to said counter outputs and a plurality of outputs, and (e) signal generating means having an output coupled to the input of said amplifier and a set of inputs coupled to said decoder outputs for producing a second polarity reference signal having a successively larger discrete value in response to a signal at successive ones of said decoder outputs.

12. In a system for producing an output signal which is an arbitrary function of at least one independent variable represented by a first-polarity input signal, an interpolating control system comprising in combination:

(a) integrating means, having an input, for producing an output signal whose voltage value is proportional to the time integral of a signal applied to said input, (b) means for producing a second-polarity reset signal at the instant when the output of said integrating means reaches a predetermined second-polarity value, (c) means for producing a first-polarity reset signal at the instant when the output of said integrating means reaches a predetermined first-polarity voltage value, (d) means, having a first and a second input for receiving discrete input signals and a plurality of outputs, for registering and for signaling at said outputs, as a net accumulating count, the number of signals received at its first input less the number of signals received at its second input, (e) means for applying a signal to the first input of said registering means for each of said second-polarity reset signals, (f) means for applying a signal to the second input of said registering means for each of said first-polarity reset signals, (g) signal generating means responsive to said registering means for producing a second polarity reference signal having a successively larger, predetermined value for each successively higher net count signaled by said registering means, (h) means for adding said reference signal to said input signal so as to produce a net input signal to said integrating means, and (i) means for adding said first-polarity and said second-polarity reset signals to said net signal, the volt-second content of each of said reset signals being set to equal the volt-second content of said net input signals.

References Cited

UNITED STATES PATENTS

| | | | |
|---|---|---|---|
| 2,428,811 | 10/1947 | Rajchman. | |
| 2,797,865 | 7/1957 | Beattie et al. | 235—197 |
| 2,933,254 | 4/1960 | Goldberg et al. | 235—197 |
| 3,158,739 | 11/1964 | Herzog | 235—197 |
| 3,192,374 | 6/1965 | Henn et al. | 235—197 |
| 3,217,152 | 11/1965 | Dahlin | 235—197 |
| 3,261,971 | 7/1966 | Nathan | 235—197 |
| 3,110,802 | 11/1963 | Ingham et al. | 235—197 |

FOREIGN PATENTS

| | | |
|---|---|---|
| 129,032 | 7/1959 | U.S.S.R. |

OTHER REFERENCES

Meissinger: An Electronic Circuit for the Generation of Functions of Several Variables, IRE Convention Record, part 4, vol. 13, 1955, pp. 150–161.

MALCOLM A. MORRISON, Primary Examiner

ROBERT W. WEIG, Assistant Examiner

U.S. Cl. X.R.

235—183